US011486486B2

(12) United States Patent
Trinh et al.

(10) Patent No.: US 11,486,486 B2
(45) Date of Patent: Nov. 1, 2022

(54) SENSOR BAR WITH OIL CHANNEL IN A TRANSMISSION

(71) Applicant: Ningbo Geely Automobile Research & Development Co., Ltd., Ningbo (CN)

(72) Inventors: Freddy Trinh, Gothenburg (SE); Håkan Jacobson, Kullavik (SE); Daniel Haraldsson, Svanesund (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 179 days.

(21) Appl. No.: 17/092,432

(22) Filed: Nov. 9, 2020

(65) Prior Publication Data

US 2021/0054918 A1 Feb. 25, 2021

Related U.S. Application Data

(63) Continuation of application No. PCT/CN2019/084772, filed on Apr. 28, 2019.

(30) Foreign Application Priority Data

May 14, 2018 (EP) ..................... 18172159

(51) Int. Cl.
*F16H 57/04* (2010.01)
*F16H 57/02* (2012.01)
(52) U.S. Cl.
CPC ....... *F16H 57/0423* (2013.01); *F16H 57/043* (2013.01); *F16H 57/0471* (2013.01); *F16H 57/0478* (2013.01); *F16H 2057/02095* (2013.01)

(58) Field of Classification Search
CPC ............... F16H 57/0423; F16H 57/043; F16H 57/0471; F16H 57/0478; F16H 2057/02095
See application file for complete search history.

(56) References Cited

U.S. PATENT DOCUMENTS

| 9,528,593 | B2 * | 12/2016 | Tage ....................... F16H 3/089 |
| 2008/0202853 | A1 | 8/2008 | Ogami |
| 2010/0319486 | A1 * | 12/2010 | Kawamoto ......... F16H 57/0423 |
| | | | 74/467 |
| 2011/0214947 | A1 * | 9/2011 | Tuomas .............. F16H 57/0494 |
| | | | 184/6.12 |

(Continued)

FOREIGN PATENT DOCUMENTS

| CN | 1730980 A | 2/2006 |
| CN | 101377189 A | 3/2009 |

(Continued)

OTHER PUBLICATIONS

International Search Report from corresponding International Application No. PCT/CN2019/084772, dated Jul. 24, 2019, 3 pages.

(Continued)

*Primary Examiner* — Minh Truong
(74) *Attorney, Agent, or Firm* — Tucker Ellis LLP

(57) ABSTRACT

A transmission includes a bar supporting at least one sensor for measuring an operating parameter of the transmission. The sensor bar is provided with an oil channel for transportation of lubrication oil to at least one component of the transmission.

10 Claims, 3 Drawing Sheets

(56) References Cited

U.S. PATENT DOCUMENTS

| | | | | |
|---|---|---|---|---|
| 2012/0096968 A1* | 4/2012 | Kawamoto | ......... | F16H 57/0423 |
| | | | | 74/467 |
| 2013/0283955 A1 | 10/2013 | Araki et al. | | |
| 2015/0219180 A1 | 8/2015 | Tan et al. | | |
| 2016/0319932 A1 | 11/2016 | Ziemer et al. | | |
| 2017/0001513 A1* | 1/2017 | Kuroda | ................... | F16C 43/04 |

FOREIGN PATENT DOCUMENTS

| | | | |
|---|---|---|---|
| CN | 104141774 | A | 11/2014 |
| CN | 104728395 | A | 6/2015 |
| CN | 105007868 | A | 10/2015 |
| CN | 205089955 | U | 3/2016 |
| CN | 106443073 | A | 2/2017 |
| CN | 206190876 | U | 5/2017 |
| CN | 207316042 | U | 5/2018 |
| DE | 102015207930 | A1 | 11/2016 |
| EP | 1626208 | A2 | 2/2006 |
| JP | H0872781 | A | 3/1996 |
| JP | 2013185672 | A | 9/2013 |
| WO | 2017110583 | A1 | 6/2017 |

OTHER PUBLICATIONS

International Preliminary Report on Patentability from corresponding International Application No. PCT/CN2019/084772, completed on Aug. 21, 2020, 10 pages.

* cited by examiner

SENSOR BAR WITH OIL CHANNEL IN A TRANSMISSION

RELATED APPLICATION DATA

This application is a continuation of International Patent Application No. PCT/CN2019/084772, filed Apr. 28, 2019, which claims the benefit of European Patent Application No. 18172159.8, filed May 14, 2018, the disclosures of which are incorporated herein by reference in their entireties.

TECHNICAL FIELD

The invention relates to a transmission having a bar supporting at least one sensor for measuring an operating parameter of the transmission.

BACKGROUND

Vehicle transmissions usually have sensors for measuring operating parameters of the transmissions. Such sensors can be arranged in a housing of the transmission. For providing sensor positions the sensors can be arranged on a bar extending into the inner space of the transmission.

There is a lot of components inside a transmission and many components also have to be lubricated by oil for functioning as intended. This makes the transmission relatively complicated and the packing space in the transmission is often very limited.

SUMMARY

An objective of the invention is to provide a transmission enabling a reduced number of components and thereby an increased available space inside the transmission and saved costs.

The objective is achieved by a transmission, wherein the transmission comprises a bar supporting at least one sensor for measuring an operating parameter of the transmission and the sensor bar is provided with an oil channel for transportation of lubrication oil to at least one component of the transmission.

The invention is based on the insight that by such a transmission, a sensor position for measuring an operating parameter and means for lubrication of a component can be achieved by use of one and the same part.

The sensor supported by the sensor bar can be any sensor arranged on the sensor bar for measuring for example the speed of a shaft or a gear wheel of the transmission or the position of a gear shifting fork or a sleeve of the transmission.

The component to be lubricated can be a part of a synchronizer device or a bearing, for instance.

According to one embodiment of the transmission, the oil channel has an inlet arranged in vicinity of a space arranged inside the transmission for containing oil, and a gear wheel of the transmission is arranged for rotating in the oil of the space and drawing oil to the inlet of the oil channel. Hereby, no additional part is needed for providing the oil to the oil channel, since an existing gear wheel, such as for example a final drive gear of a differential, can be used for transportation of the oil to the oil channel.

According to a further embodiment, the sensor bar is arranged to extend in an axial direction across the transmission enabling transportation of oil in the oil channel from a first side of the transmission to said at least one component at a second side of the transmission. Hereby, the component or components to be lubricated can be reached at the same time as several relevant positions along the sensor bar are available for arranging sensors for measuring operating parameters of the transmission.

According to a further embodiment, the sensor bar has an inclined open chute forming the oil channel for transportation of oil by gravity. Hereby, the oil can easily be brought by a gear wheel into the oil channel and further transportation of the oil in the oil channel can be performed without any additional means, such as a pump or similar.

According to a further embodiment, an outlet of the oil channel is fluidly connected to the space inside of a tubular shaft of the transmission and said at least one component is arranged on the tubular shaft and fluidly connected to the oil channel via a radially directed through hole of the tubular shaft extending between the component and the space inside of the tubular shaft. Hereby, components arranged on a shaft, such as synchronizer device parts, arranged at various positions, which otherwise could be difficult to reach, can be lubricated by oil from the oil channel by using only one outlet of the oil channel fluidly connected to the space inside of the shaft at one end thereof.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
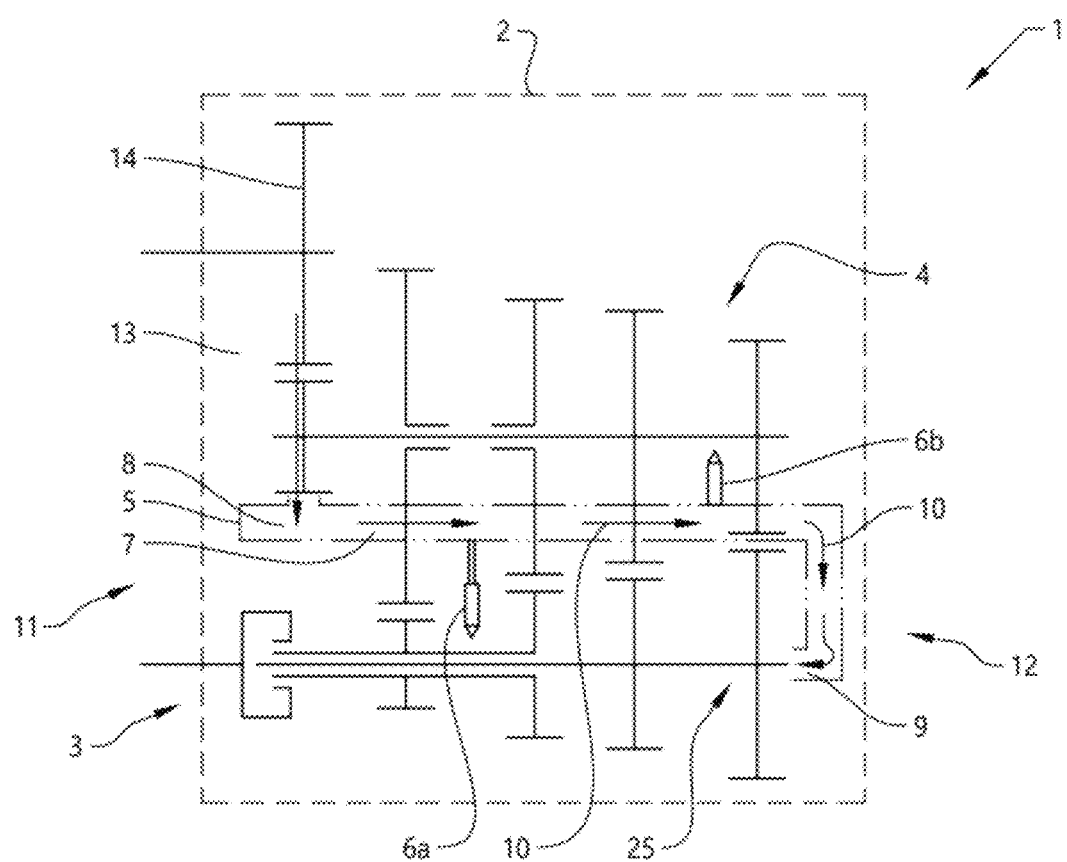
FIG. 1 is a schematic view showing a transmission having a sensor bar.

FIG. 1 is a schematic view showing a transmission 1 having a housing 2, an input shaft 3 and an output shaft 4. The transmission 1 has a bar 5 supporting at least one sensor 6a, 6b for measuring an operating parameter of the transmission 1. In the illustrated example embodiment in FIG. 1, a first sensor 6a and a second sensor 6b are arranged on the sensor bar 5. The first sensor 6a is arranged for measuring a parameter related to the input shaft 3 and the second sensor 6b is arranged for measuring a parameter related to the output shaft 4. The sensor bar 5 can be arranged between the input shaft 3 and the output shaft 4, though on another level as illustrated.

The sensor bar 5 is suitably arranged substantially in parallel with the input shaft 3 and the output shaft 4. The sensor bar 5 is provided with an oil channel 7 for transportation of lubrication oil to at least one component of the transmission 1. The oil channel 7 has an oil inlet 8 and an oil outlet 9. The flow of oil along the oil channel 7 is schematically indicated by arrows 10. The sensor bar 5 can be arranged to extend in an axial direction across the transmission 1 enabling transportation of oil in the oil channel 7 from a first side 11 of the transmission to said at least one component at a second side 12 of the transmission. The sensor bar 5 can be arranged to extend in the axial direction across substantially the entire length of the transmission 1, and the sensor bar 5 is preferably attached to the housing 2 at the first side 11 and/or the second side 12 of the transmission 1.

The oil channel inlet 8 is suitably arranged in vicinity of a space 13 arranged inside the transmission 1 for containing oil. A gear wheel 14 of the transmission 1 can be arranged for rotating in the oil of the space and drawing oil to the inlet 8 of the oil channel 7. This space can be an oil sump or any space containing oil to be used for lubrication. In the illustrated example embodiment, the gear wheel 14 is a final drive gear of a differential of the transmission 1. When rotating, the gear wheel 14 is splashing oil to be collected and transported by the oil channel 7 of the sensor bar 5. Although the inlet 8 of the oil channel can be constituted by an opening arranged at any position along the sensor bar 5, preferably at an end thereof, the sensor bar could also have an oil channel formed by a sensor bar 5 providing an open chute. For example, the sensor bar can have a U-shaped or V-shaped cross-section with the opening directed upwards for forming the oil channel 7 and accommodating oil therein. In such a case oil could be brought into the channel along the entire opening of the sensor bar.

Figure 2A:
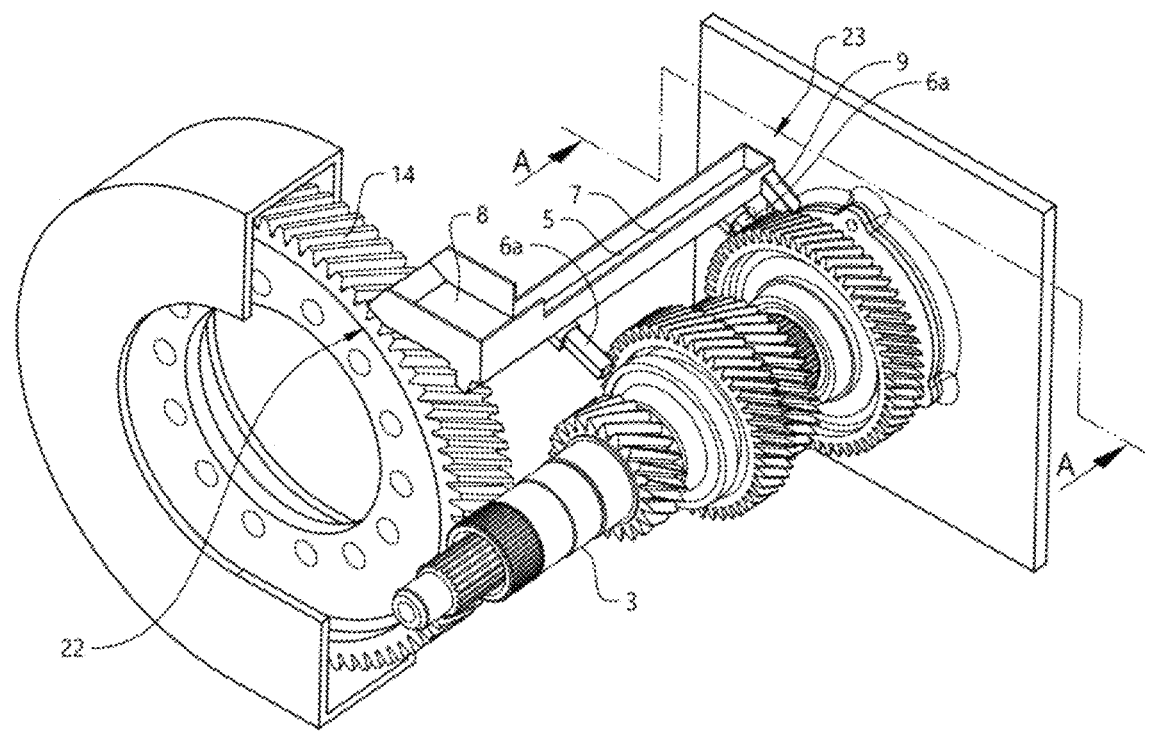
FIG. 2A is a perspective view of a shaft and the sensor bar of the transmission in FIG. 1.

FIG. 2A shows the sensor bar 5 and the input shaft 3 more in detail. In this perspective view, only some components of the transmission are shown. Other components are omitted for illustration purposes only. In the example embodiment illustrated in FIG. 2A, the sensor bar 5 has an inclined open chute forming the oil channel 7 for transportation of oil by gravity. As also appears from the enlarged view of FIG. 2B, the sensor bar 5 has a cross section with a flat bottom portion 20 and a side wall portion 21a, 21b arranged at each side of the bottom portion 20 which portions form the oil channel 7. In a first end 22 of the sensor bar 5, the oil is brought into the oil channel by means of a gear wheel 14. The sensor bar 5 is further inclined relative to a horizontal such that the oil is flowing by gravity from the inlet 8 to the outlet 9 at the other end 23 of the sensor bar 5.

A first set of sensors 6a can be arranged on the sensor bar 5 for measuring operating parameters related to the input shaft 3. A second set of sensors 6b (see FIG. 1) can be arranged on the sensor bar 5 for measuring operating parameters related to the output shaft 4. The first set of sensors can comprise a speed sensor and a position sensor for measuring a rotation speed of a shaft or a gear wheel and a position of a gear shifting fork or a sleeve, respectively. In the same way, the second set of sensors can comprise a speed sensor and a position sensor for measuring a rotation speed of a shaft or a gear wheel and a position of a gear shifting fork or a sleeve, respectively.

When the oil is reaching the outlet 9 of the oil channel 7 the oil should be distributed to one or more components to be lubricated by the oil. This is further illustrated in FIGS. 2B and 3.

Figure 2B:
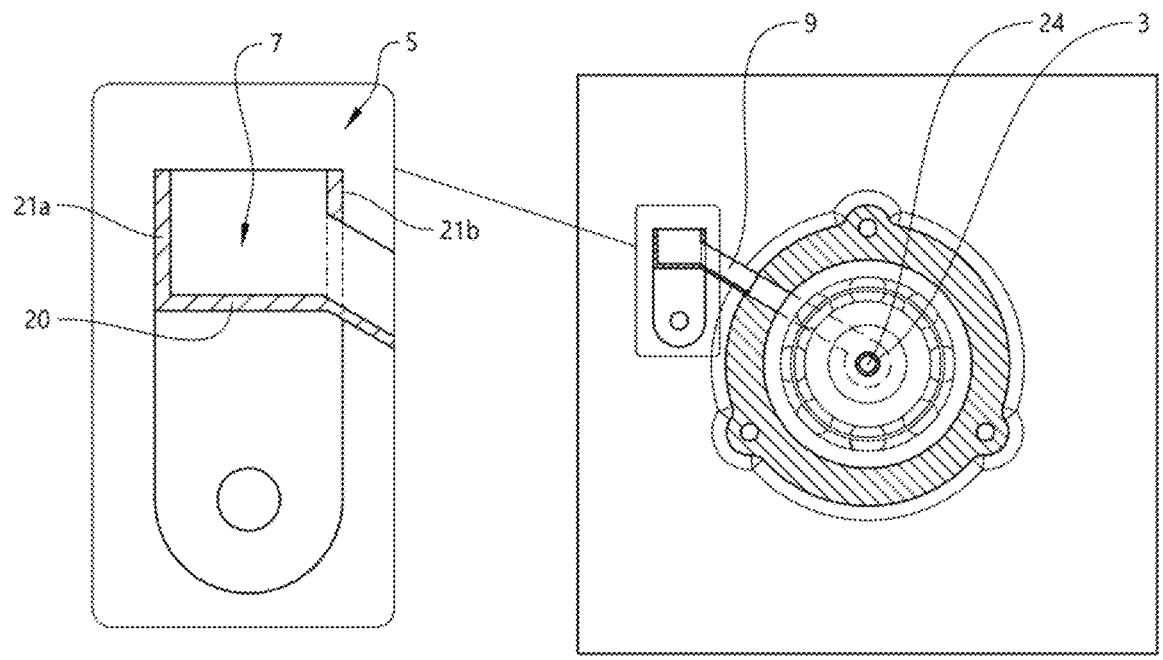
FIG. 2B is a cross-section view of the sensor bar and an end of the shaft in FIG. 2A.

FIG. 2B shows a cross-section view of the sensor bar and an end of the input shaft 3. The outlet 9 of the oil channel 7 is connected to a space 24 inside a shaft, herein exemplified by the input shaft 3.

Figure 3:
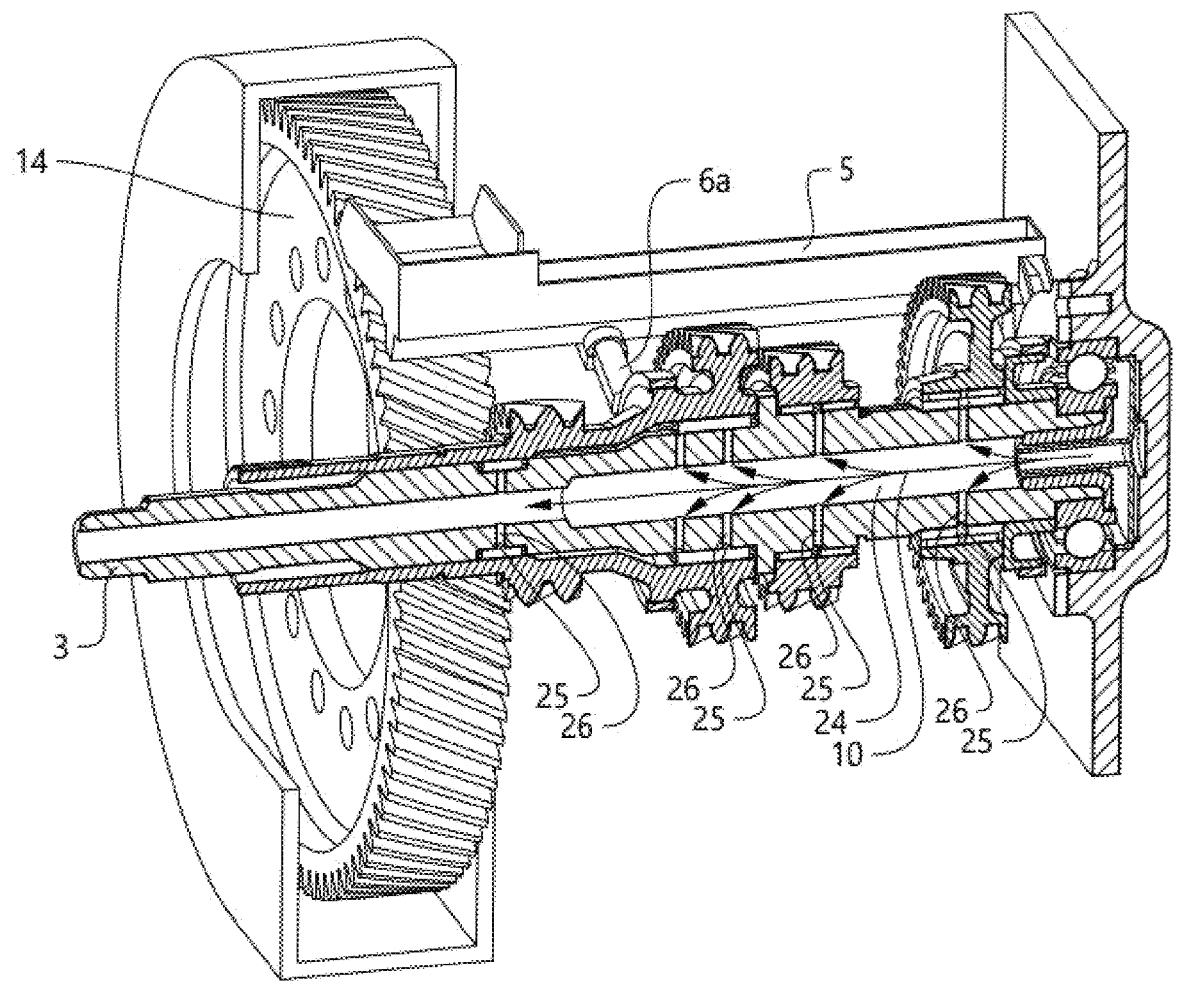
FIG. 3 is a cut view of the shaft in FIG. 2A.

FIG. 3 is a cut view of the input shaft 3 illustrated in FIG. 2A. The shaft 3 is tubular and the space 24 inside the shaft 3 is fluidly connected with the outlet 9 of the oil channel 7. The arrows 10 in FIG. 3 indicate the flow of oil from the oil channel 7 into the shaft 3. Further, the components 25 to be lubricated are arranged on the shaft 3 and fluidly connected to the inner space 24 of the shaft 3 and the oil channel 7 via one or more radially directed through holes 26 of the tubular shaft. These through holes extend between the current component 25 and the space 24 of the tubular shaft 3.

The at least one component to be lubricated can be a synchronizer component, a bearing or any other transmission component where lubrication by oil is required.

It is to be understood that the present invention is not limited to the embodiments described above and illustrated in the drawings; rather, the skilled person will recognize that many changes and modifications may be made within the scope of the appended claims.

What is claimed is:

1. A transmission comprising a bar supporting at least one sensor for measuring an operating parameter of the transmission, the sensor bar being provided with an oil channel for transportation of lubrication oil to at least one component of the transmission, wherein an outlet of the oil channel is fluidly connected to a space inside of a tubular shaft of the transmission, and said at least one component is arranged on the tubular shaft and fluidly connected to the oil channel via a radially directed through hole of the tubular shaft extending between the component and the space inside of the tubular shaft, and wherein said at least one sensor is a speed and/or position sensor.

2. A transmission according to claim 1, wherein the oil channel has an inlet arranged in vicinity of a space arranged inside the transmission for containing oil.

3. A transmission according to claim 2, wherein a gear wheel of the transmission is arranged for rotating in the oil of the space arranged inside the transmission for containing oil and drawing oil to the inlet of the oil channel.

4. A transmission according to claim 3, wherein said gear wheel is a final drive gear of a differential of the transmission.

5. A transmission according to claim 1, wherein the sensor bar is arranged to extend in an axial direction across the transmission enabling transportation of oil in the oil channel from a first side of the transmission to said at least one component at a second side of the transmission.

6. A transmission according to claim 1, wherein the sensor bar has an inclined open chute forming the oil channel for transportation of oil by gravity.

7. A transmission according to claim 1, wherein said at least one component is a part of a synchronizer device.

8. A transmission according to claim 1, wherein said at least one component is a bearing.

9. A transmission according to claim 1, wherein said at least one sensor is arranged for measuring the speed of a shaft or a gear wheel of the transmission.

10. A transmission according to claim 1, wherein said at least one sensor is arranged for measuring the position of a gear shifting fork or a sleeve of the transmission.

* * * * *